US012233533B2

(12) United States Patent
Nickolaou et al.

(10) Patent No.: US 12,233,533 B2
(45) Date of Patent: Feb. 25, 2025

(54) ROBOT MANAGEMENT IN POPULATED AREAS

(71) Applicant: Aptiv Technologies AG, Schaffhausen (CH)

(72) Inventors: James Nicholas Nickolaou, Clarkston, MI (US); Steven G. Malson, Metamora, MI (US); Yusuf Zohar Dilawar, Southfield, MI (US); Neha N. Gupta, Rochester Hills, MI (US)

(73) Assignee: Aptiv Technologies AG, Schaffhausen (CH)

( * ) Notice: Subject to any disclaimer, the term of this patent is extended or adjusted under 35 U.S.C. 154(b) by 212 days.

(21) Appl. No.: 18/159,650

(22) Filed: Jan. 25, 2023

(65) Prior Publication Data

US 2024/0246243 A1    Jul. 25, 2024

(51) Int. Cl.
| | | |
|---|---|---|
| *B25J 13/00* | (2006.01) | |
| *B25J 9/16* | (2006.01) | |
| *B25J 11/00* | (2006.01) | |
| *H04W 4/12* | (2009.01) | |
| *H04W 4/40* | (2018.01) | |

(52) U.S. Cl.
CPC .......... *B25J 13/006* (2013.01); *B25J 9/1602* (2013.01); *B25J 11/008* (2013.01); *H04W 4/12* (2013.01); *H04W 4/40* (2018.02)

(58) Field of Classification Search
CPC ....... G06Q 10/08; B25J 11/008; B25J 9/1602; B25J 13/006; H04W 4/40; H04W 4/12
See application file for complete search history.

(56) References Cited

U.S. PATENT DOCUMENTS 11,747,816 B2 * 9/2023 Nabeta ................ G05D 1/0274
701/23
2019/0377349 A1   12/2019 Merwe et al.
(Continued)

FOREIGN PATENT DOCUMENTS

WO        2016144558 A1    9/2016

OTHER PUBLICATIONS

Silva et al., Ethical Implications of Social Internet of Vehicles Systems, 2018, IEEE, p. 517-531 (Year: 2018).*

(Continued)

*Primary Examiner* — Marc McDieunel
(74) *Attorney, Agent, or Firm* — Harness, Dickey & Pierce, P.L.C.

(57) ABSTRACT

The techniques and systems herein enable robot management in populated areas. Specifically, a robot management system receives, from a robot system, a requested route and time for the robot system to travel. A dynamic map that includes dynamic and temporal information about an area of the requested route is then used to determine whether the requested route and time are approved, approved with a modified route or time, or disapproved. An approval message, a modified approval message, or a disapproval message is then generated and sent to the robot system. By using the described techniques, municipalities can monitor, manage, and regulate robots across various operators and locations. Doing so may prevent a high density of robots along various routes, disruptions to the services of such robots, and/or disruptions to surrounding pedestrians and vehicles.

20 Claims, 12 Drawing Sheets

(56) References Cited

U.S. PATENT DOCUMENTS

2020/0317118 A1    10/2020  Yesh et al.
2021/0114225 A1*    4/2021  Fukunaga ............ G05D 1/0248
2022/0157178 A1     5/2022  Grace et al.
2024/0246560 A1*    7/2024  Nickolaou .............. H04W 4/44

OTHER PUBLICATIONS

Hirata et al., Control architecture of delivery robot for supporting nursing staff, 2015, IEEE, p. 345-351 (Year: 2015).*
Motlagh et al., Low-Altitude Unmanned Aerial Vehicles-Based Internet of Things Services: Comprehensive Survey and Future Perspectives, 2016, IEEE, p. 899-922 (Year: 2016).*
Gharaibeh et al., Smart Cities: A Survey on Data Management, Security, and Enabling Technologies, 2017, IEEE, p. 2456-2501 (Year: 2017).*
"Extended European Search Report", EP Application No. 23158324.6, Aug. 18, 2023, 9 pages.
"Extended European Search Report", EP Application No. 23158387.3, Aug. 17, 2023, 8 pages.

* cited by examiner

ROBOT MANAGEMENT IN POPULATED AREAS

BACKGROUND

Robots have made their way into many aspects of modern life, such as delivering goods over short distances (e.g., within a mile). Such delivery robots, e.g., Last Mile Delivery (LMD) robots, are often deployed in populated areas and inside buildings (e.g., urban environments) and are configured to deliver mail, packages, food, groceries, concierge or room service, and/or other goods. Use of such robots may reduce traffic and emissions while also lowering overhead (e.g., fuel and/or other costs) when compared to human, automobile, or truck-based delivery.

As commercial and private operators cause robots to appear more frequently in populated or limited restricted areas (e.g. lobbies, hallways, or elevators), there may be little oversight for ensuring robots operate in a safe and unobtrusive manner among traffic and pedestrians. For example, robots may be free to operate according to their operators' commercial or private interests regardless of potential negative effects on traffic, pedestrian safety, or public opinion in the adoption of robots in populated areas.

SUMMARY

This document is directed to systems, apparatuses, techniques, and methods for enabling robot management in populated areas. The systems and apparatuses may include components or means (e.g., processing systems) for performing the techniques and methods described herein.

Some aspects described below include a method performed by a robot management system that includes receiving, from a robot system, a requested route for the robot system to travel along and a requested time for the robot system to travel along the requested route. The method further includes receiving a dynamic map containing information about the requested route and surrounding areas of a building interior and/or an urban environment or city at the requested time and other times. The method also includes determining, based on the dynamic map, whether the requested route and the requested time are approved, determining, based on the dynamic map, whether the requested route and the requested time are approved with at least one of a modified route or a modified time, and determining, based on the dynamic map, whether the requested route and the requested time are disapproved. The method further includes generating an approval message, a modified approval message, or a disapproval message based on whether the requested route and the requested time are approved, approved with a modification, or disapproved, respectively, and sending the approval message, the modified approval message, or the disapproval message to the robot system.

The means may include systems comprising at least one processor configured to perform the above or other methods. The components may include computer-readable media (e.g., non-transitory storage media) including instructions that, when executed by the systems, other systems or components, or combinations thereof, implement the methods above and other methods.

This Summary introduces simplified concepts for enabling robot management in populated areas that are further described in the Detailed Description and Drawings. This Summary is not intended to identify essential features of the claimed subject matter, nor is it intended for use in determining the scope of the claimed subject matter.

BRIEF DESCRIPTION OF THE DRAWINGS

Systems and techniques for enabling robot management in populated areas are described with reference to the following drawings that use some of the same numbers throughout to reference like or examples of like features and components.

DETAILED DESCRIPTION

Overview

Robots configured to deliver mail, packages, food, groceries, concierge or room service, and/or other goods or services are often deployed in populated areas (e.g., urban environments, inside buildings). Use of such robots may reduce traffic and emissions while also lowering overhead (e.g., fuel and/or other costs) when compared to human, automobile, or truck-based delivery. As commercial and private operators cause these robots to appear more frequently in populated areas, there may be little oversight for ensuring robots operate in an efficient, safe, and unobtrusive manner among traffic and pedestrians. For example, robots may be free to operate according to their operators' commercial or private interests regardless of potential negative effects on traffic, pedestrian safety, or public opinion in the adoption of robots in populated areas.

Furthermore, without oversight, these robots often struggle to deal with real-world scenarios, such as overcrowded streets, elevators, hallways with pedestrians or other objects, handicapped people traveling on the sidewalk, other robots, and/or other vehicles in bike lanes and cross intersections. For example, when two robots are on a head-on collision scenario, they may simply stop within some proximity of each other and wait for the other to move. Not only do the goods fail to get delivered, but the robots can make the traffic situations they are supposed to help worse.

In some examples, the techniques and systems herein enable robot management in populated areas. Specifically, a robot management system receives, from a robot system, a requested route and time for the robot system to travel. A dynamic map that includes dynamic and temporal information about an area of the requested route is then used to determine whether the requested route and time are approved, approved with a modified route or time, or disapproved. An approval message, a modified approval message, or a disapproval message is then generated and sent to the robot system. By using the described techniques, municipalities or businesses can monitor, manage, and regulate robots across various disparate robot operators. Doing so may minimize densities of robots along various routes, disruptions to the services of such robots, and/or disruptions to surrounding pedestrians and vehicles.

EXAMPLE ENVIRONMENT

Figure 1:
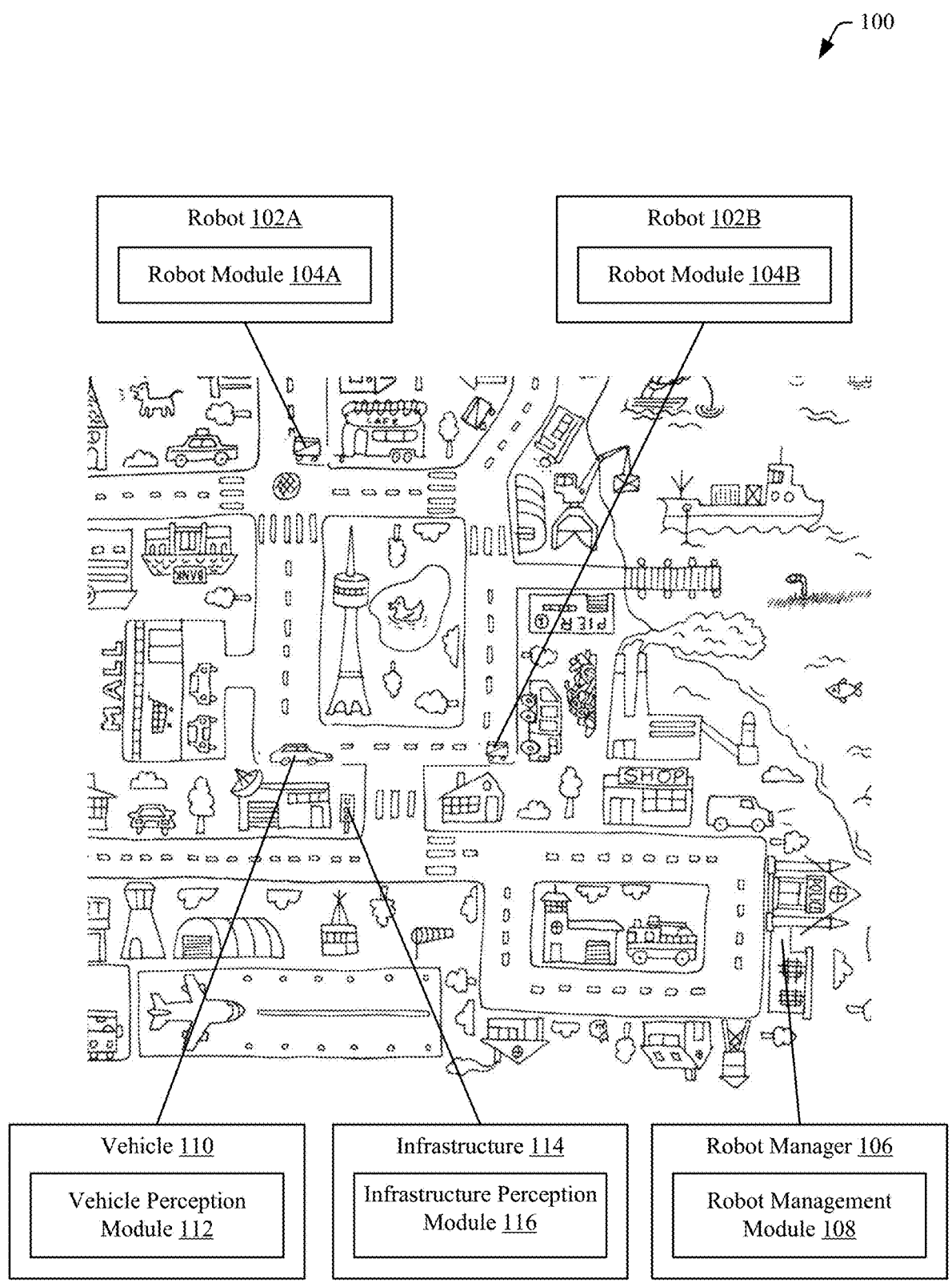
FIG. 1 illustrates, in accordance with techniques of this disclosure, an example environment where robot management in populated areas may be used.

FIG. 1 illustrates an example environment 100 where robot management in populated areas may be used. The example environment 100 includes many aspects of a typical urban environment or city (e.g., roads, buildings, cars, objects, construction zones) and robots 102 (e.g., robots 102A and 102B) with respective robot modules 104 (e.g., 104A and 104B), which may be implemented in software, hardware, or a combination thereof. Although not shown, the environment 100 may also contain building interiors (e.g., insides, hallways, and/or elevators of malls, hotels, and/or other buildings) that the robots 102 may operate within. The robots 102 may comprise any number of autonomous vehicles and/or devices. For example, the robots 102 may be LMD robots, drones, or other robots. Although only two robots 102 are shown, any number of robots 102 may exist within the urban environment.

The robots 102 may be owned, leased, rented, operated, and/or hired by one or more operators, which may be individual, private, commercial, or government entities. For example, robots 102 may both be associated with a single delivery company, or they may be associated with separate delivery companies. Furthermore, the robot modules 104 (or portions thereof) may be remote to the robots 102. For example, a single robot module 104 may exist for multiple robots 102. In this way, each operator may have a robot module 104 in addition to, or instead of, each robot 102 (performing different functionalities of the robot module 104). Regardless of how it is implemented, the robot module 104 is configured to request routes and times for at least one robot 102 to travel along and to receive approval messages, modified approval messages, and disapproval messages corresponding to those requested routes and times. Functionality of the robot module 104 is discussed further below.

The example environment 100 also includes a robot manager 106 with a robot management module 108, which may be implemented in software, hardware, or some combination thereof. The robot manager 106 may be any system configured to communicate with the robots 102 and/or the robot modules 104 (e.g., private or public server or cloud system). The robot management module 108 is configured to manage operation of the robots 102 (e.g., manage routes, approve/disapprove routes, maintain a dynamic map, monitor robots 102 as they travel along routes). Functionality of the robot management module 108 is discussed further below.

The example environment 100 further includes a vehicle 110 with a vehicle perception module 112, which may be implemented in software, hardware, or some combination thereof and an infrastructure 114 with an infrastructure perception module 116, which may be implemented in software, hardware, or some combination thereof. The vehicle 110 may be any automobile, truck, bicycle, or other vehicle with sensor systems able detect attributes of the robots 102. The infrastructure 114 may be any device capable of detecting attributes of the robots 102 (e.g., streetlight, smart device, cell phone, interior or exterior camera, cell tower).

The vehicle perception module 112 and the infrastructure perception module 116 are configured to identify attributes of robots 102 as they progress around the environment and communicate the attributes to the robot manager 106. Functionality of the vehicle perception module 112 and the infrastructure perception module 116 is discussed further below.

EXAMPLE SYSTEMS

Figure 2:
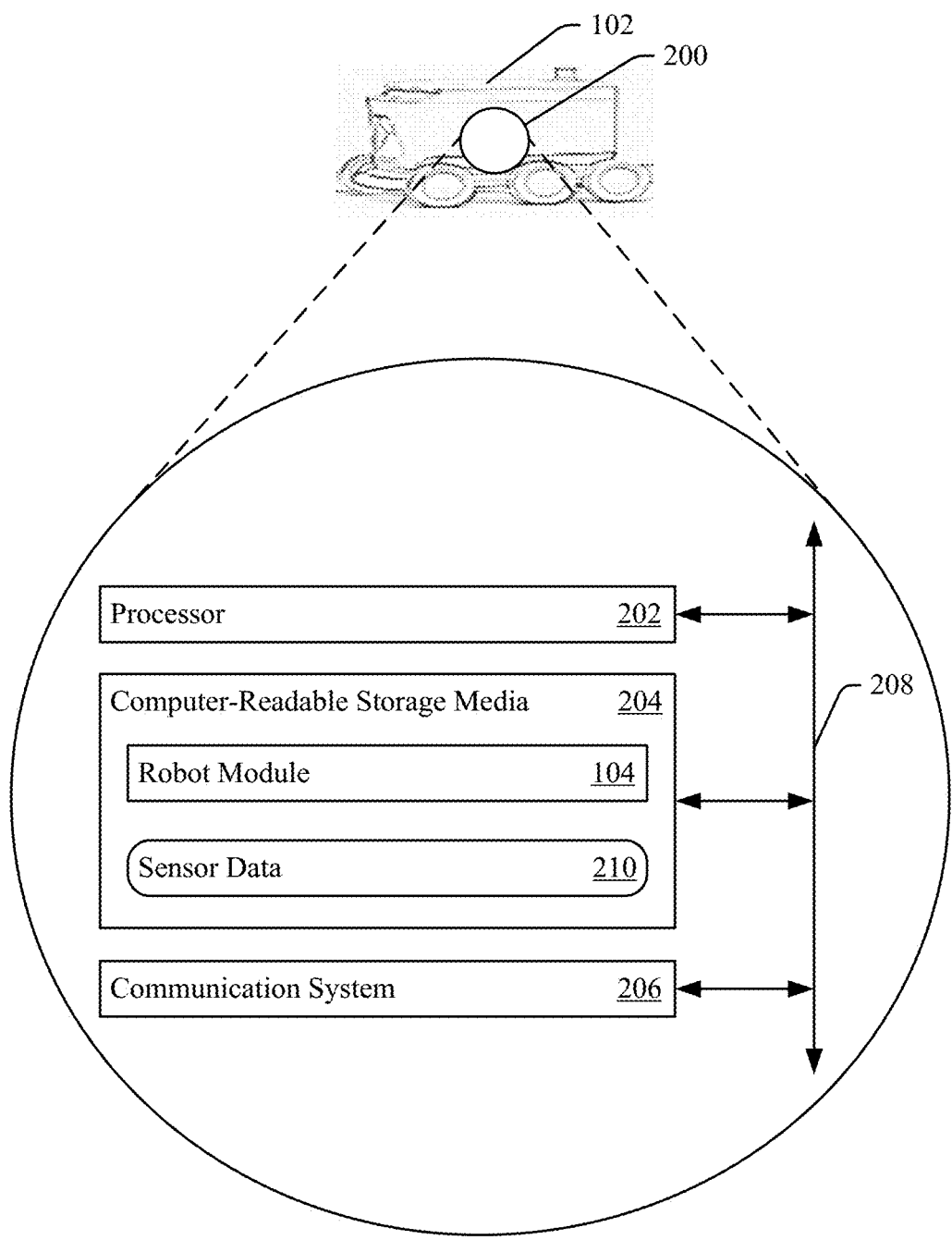
FIG. 2 illustrates, in accordance with techniques of this disclosure, an example robot system configured to implement robot management in populated areas.

FIG. 2 illustrates an example robot system 200 configured to be disposed in a robot 102 and configured to implement robot management in populated areas. Components of the robot system 200 may be arranged anywhere within or on the robot 102. The robot system 200 may include at least one processor 202, computer-readable storage media 204 (e.g., media, medium, mediums), and a communication system 206. The components are operatively and/or communicatively coupled via a link 208 (e.g., wired or wireless).

The processor 202 (e.g., application processor, microprocessor, digital-signal processor (DSP), controller) is coupled to the computer-readable storage media 204 via the link 208 and executes instructions (e.g., code) stored within the computer-readable storage media 204 (e.g., non-transitory storage device such as a hard drive, solid-state drive (SSD), flash memory, read-only memory (ROM)) to implement or otherwise cause the robot module 104 (or a portion thereof) to perform the techniques described herein. Although shown as being within the computer-readable storage media 204, the robot module 104 may be a stand-alone component (e.g., having dedicated computer-readable storage media comprising instructions and/or executed on dedicated hardware, such as a dedicated processor, pre-programmed field-programmable-gate-array (FPGA), system on chip (SOC), and the like). Furthermore, portions of the robot module 104 may exist outside the robot 102 acting on behalf of the robot 102 (e.g., in a centralized computer system of an operator). The processor 202 and the computer-readable storage media 204 may be any number of components, comprise multiple components distributed throughout the robot 102, located remote to the robot 102, dedicated or shared with other components, modules, or systems of the robot 102, and/or configured differently than illustrated without departing from the scope of this disclosure.

The computer-readable storage media 204 also contains sensor data 210 generated by one or more sensors or types of sensors (not shown) that may be local or remote to the robot system 200. The sensor data 210 indicates or otherwise enables the determination of information usable to perform the techniques described herein. In some implementations, the sensor data 210 may come from a remote source (e.g., via communication system 206).

The communication system 206 may be any number of systems or components configured to communicate with remote systems. For example, the communication system 206 may be configured to communicate with other robots 102, the robot manager 106, a central operator system in communication with the robot manager 106, the vehicle 110, and/or the infrastructure 114. The communication system 206 may communicate via any wired or wireless connection and/or communication protocol (e.g., ethernet, fiberoptic, Wi-Fi, Bluetooth, everything to everything (X2X), dedicated short-range communications (DSRC), internet-of-things (IoT), cellular).

Figure 3:
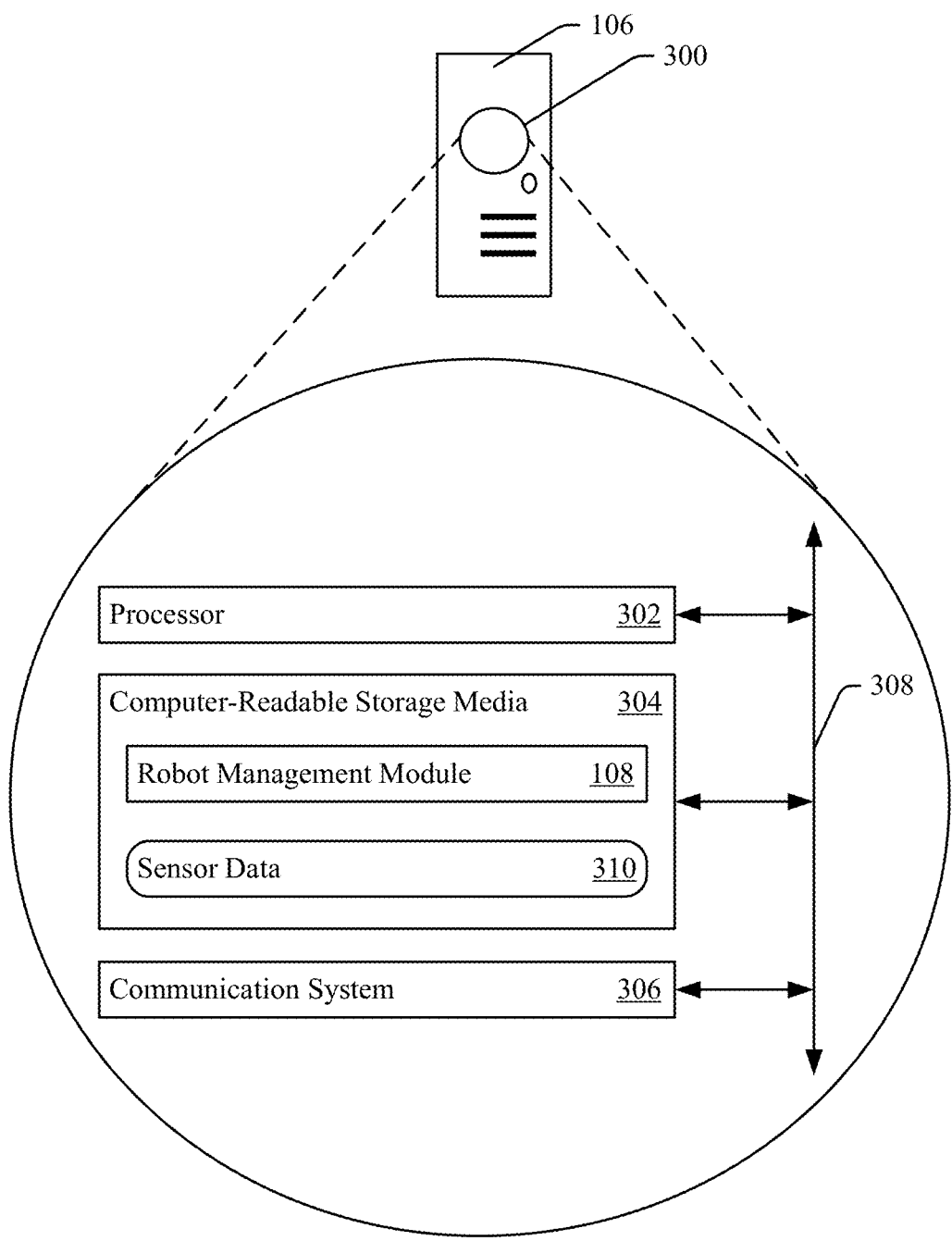
FIG. 3 illustrates, in accordance with techniques of this disclosure, an example robot manager system configured to implement robot management in populated areas.

FIG. 3 illustrates an example robot manager system 300 configured to be disposed in the robot manager 106 and configured to implement robot management in populated areas. Components of the robot manager system 300 may be arranged anywhere within the robot manager 106. The robot manager system 300 may include at least one processor 302, computer-readable storage media 304 (e.g., media, medium, mediums), and a communication system 306. The components are operatively and/or communicatively coupled via a link 308 (e.g., wired or wireless).

The processor 302 (e.g., application processor, microprocessor, digital-signal processor (DSP), controller) is coupled to the computer-readable storage media 304 via the link 308 and executes instructions (e.g., code) stored within the computer-readable storage media 304 (e.g., non-transitory storage device such as a hard drive, solid-state drive (SSD), flash memory, read-only memory (ROM)) to implement or otherwise cause the robot management module 108 (or a portion thereof) to perform the techniques described herein. Although shown as being within the computer-readable storage media 304, the robot management module 108 may be a stand-alone component (e.g., having dedicated computer-readable storage media comprising instructions and/or executed on dedicated hardware, such as a dedicated processor, pre-programmed field-programmable-gate-array (FPGA), system on chip (SOC), and the like). The processor 302 and the computer-readable storage media 304 may be any number of components, comprise multiple components distributed throughout the robot manager 106, located remote to the robot manager 106, dedicated or shared with other components, modules, or systems of the robot manager 106, and/or configured differently than illustrated without departing from the scope of this disclosure.

The computer-readable storage media 304 also contains sensor data 310 generated by one or more sensors or types of sensors (not shown) that may be local or remote to the robot manager system 300. The sensor data 310 indicates or otherwise enables the determination of information usable to perform the techniques described herein. In some implementations, the sensor data 310 may come from a remote source (e.g., via communication system 306).

The communication system 306 may be any number of systems or components configured to communicate with remote systems. For example, the communication system 306 may be configured to communicate with robots 102, a central operator system in communication with the robots 102, the vehicle 110, and/or the infrastructure 114. The communication system 306 may communicate via any wired or wireless connection and/or communication protocol (e.g., ethernet, fiberoptic, Wi-Fi, Bluetooth, X2X, dedicated short-range communications (DSRC), internet-of-things (IoT), cellular).

Figure 4:
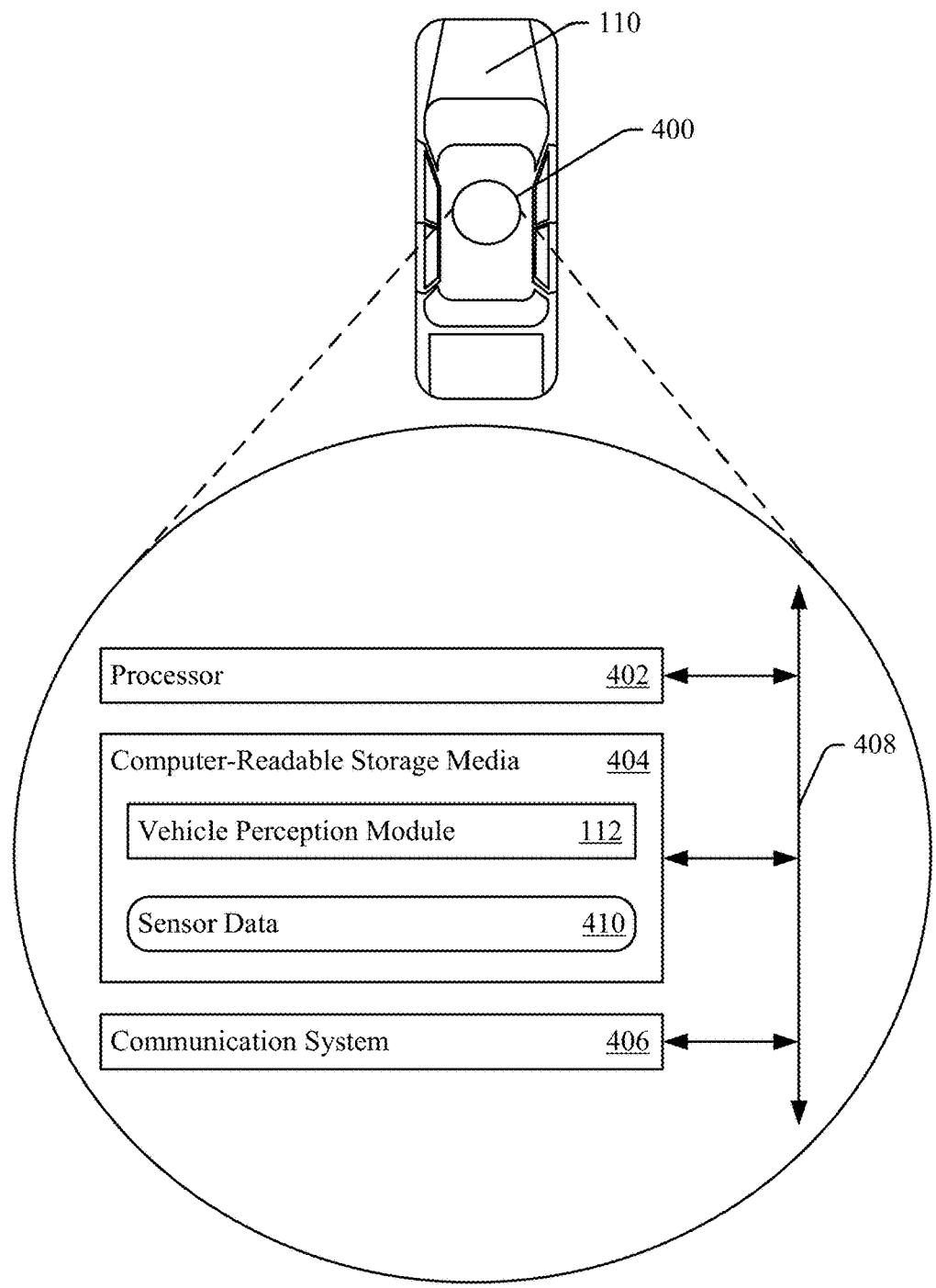
FIG. 4 illustrates, in accordance with techniques of this disclosure, an example vehicle system configured to implement robot management in populated areas.

FIG. 4 illustrates an example vehicle system 400 configured to be disposed in the vehicle 110 and configured to implement robot management in populated areas. Components of the vehicle system 400 may be arranged anywhere within the vehicle 110. The vehicle system 400 may include at least one processor 402, computer-readable storage media 404 (e.g., media, medium, mediums), and a communication system 406. The components are operatively and/or communicatively coupled via a link 408 (e.g., wired or wireless).

The processor 402 (e.g., application processor, microprocessor, digital-signal processor (DSP), controller) is coupled to the computer-readable storage media 404 via the link 408 and executes instructions (e.g., code) stored within the computer-readable storage media 404 (e.g., non-transitory storage device such as a hard drive, solid-state drive (SSD), flash memory, read-only memory (ROM)) to implement or otherwise cause the vehicle perception module 112 (or a portion thereof) to perform the techniques described herein. Although shown as being within the computer-readable storage media 404, the vehicle perception module 112 may be a stand-alone component (e.g., having dedicated computer-readable storage media comprising instructions and/or executed on dedicated hardware, such as a dedicated processor, pre-programmed field-programmable-gate-array (FPGA), system on chip (SOC), and the like). The processor 402 and the computer-readable storage media 404 may be any number of components, comprise multiple components distributed throughout the vehicle 110, located remote to the vehicle 110, dedicated or shared with other components, modules, or systems of the vehicle 110, and/or configured differently than illustrated without departing from the scope of this disclosure.

The computer-readable storage media 404 also contains sensor data 410 generated by one or more sensors or types of sensors (not shown) that may be local or remote to the vehicle system 400. The sensor data 410 indicates or otherwise enables the determination of information usable to perform the techniques described herein. In some implementations, the sensor data 410 may come from a remote source (e.g., via communication system 406).

The communication system 406 may be any number of systems or components configured to communicate with remote systems. For example, the communication system 406 may be configured to communicate with robots 102, a central operator system in communication with the robots 102, the robot manager 106, other vehicles 110, and/or the infrastructure 114. The communication system 406 may communicate via any wired or wireless connection and/or communication protocol (e.g., ethernet, fiberoptic, Wi-Fi, Bluetooth, X2X, dedicated short-range communications (DSRC), internet-of-things (IoT), cellular).

Figure 5:
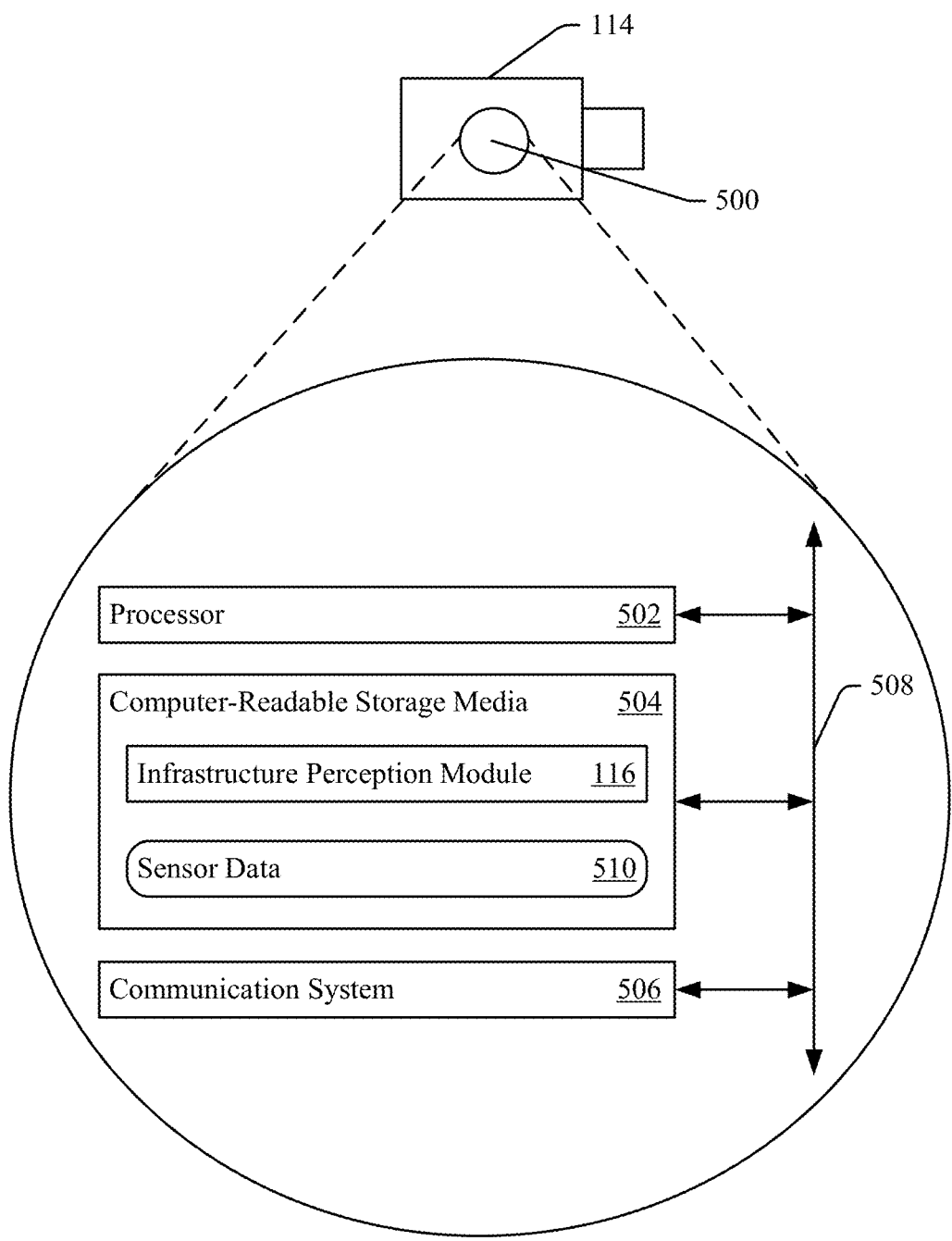
FIG. 5 illustrates, in accordance with techniques of this disclosure, an example infrastructure system configured to implement robot management in populated areas.

FIG. 5 illustrates an example infrastructure system 500 configured to be disposed in the infrastructure 114 and configured to implement robot management in populated areas. Components of the infrastructure system 500 may be arranged anywhere within the infrastructure 114. The infrastructure system 500 may include at least one processor 502, computer-readable storage media 504 (e.g., media, medium, mediums), and a communication system 506. The components are operatively and/or communicatively coupled via a link 508 (e.g., wired or wireless).

The processor 502 (e.g., application processor, microprocessor, digital-signal processor (DSP), controller) is coupled to the computer-readable storage media 504 via the link 508 and executes instructions (e.g., code) stored within the computer-readable storage media 504 (e.g., non-transitory storage device such as a hard drive, solid-state drive (SSD), flash memory, read-only memory (ROM)) to implement or otherwise cause the infrastructure perception module 116 (or a portion thereof) to perform the techniques described herein. Although shown as being within the computer-readable storage media 504, the infrastructure perception module 116 may be a stand-alone component (e.g., having dedicated computer-readable storage media comprising instructions and/or executed on dedicated hardware, such as a dedicated processor, pre-programmed field-programmable-gate-array (FPGA), system on chip (SOC), and the like). The processor 502 and the computer-readable storage media 504 may be any number of components, comprise multiple components distributed throughout the infrastructure 114, located remote to the infrastructure 114, dedicated or shared with other components, modules, or systems of the infrastructure 114, and/or configured differently than illustrated without departing from the scope of this disclosure.

The computer-readable storage media 504 also contains sensor data 510 generated by one or more sensors or types of sensors (not shown) that may be local or remote to the infrastructure system 500. The sensor data 510 indicates or otherwise enables the determination of information usable to perform the techniques described herein. In some implementations, the sensor data 510 may come from a remote source (e.g., via communication system 506).

The communication system 506 may be any number of systems or components configured to communicate with remote systems. For example, the communication system 506 may be configured to communicate with robots 102, a central operator system in communication with the robots 102, the robot manager 106, the vehicle 110, and/or other pieces of infrastructure 114. The communication system 506 may communicate via any wired or wireless connection and/or communication protocol (e.g., ethernet, fiberoptic, Wi-Fi, Bluetooth, X2X, dedicated short-range communications (DSRC), internet-of-things (IoT), cellular).

EXAMPLE ROUTE MANAGEMENT

Figure 6:
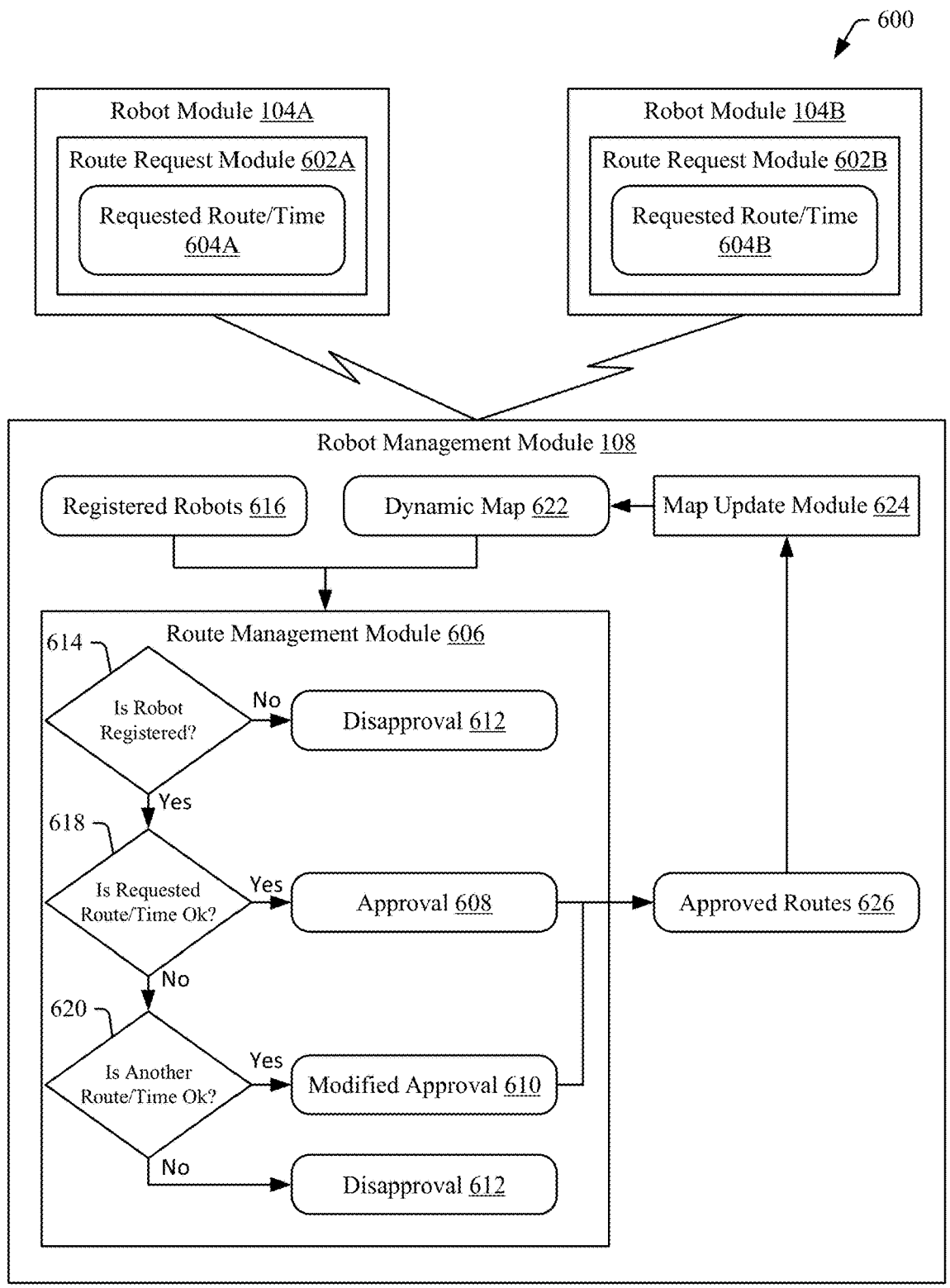
FIG. 6 illustrates, in accordance with techniques of this disclosure, an example flow of route management for robot management in populated areas.

FIG. 6 illustrates, at 600, an example flow of route management for robot management in populated areas. The example flow contains two robot modules 104 that may be associated with two robots or respective operators (acting on behalf of one or more robots). Each robot module 104 contains a route request module 602 that is configured to generate a requested route/time 604. The requested route/time 604 may contain an identifier of an associated robot (e.g., serial number (alphanumeric), registration number (alphanumeric), or other identity or identifier usable to differentiate robots 102), a requested path, and a time of day (and, in some implementations, a date) the associated robot would like to travel.

Although two requested route/times 604 are shown, the system may function with any number of requested route/times 604. Continuing the previous example, the requested route/time 604A may be associated with robot 102A and requested route/time 604B may be associated with robot 102B. In the case of the robot 102A and the robot 102B being from a single operator, there may only be a single robot module 104 and a single route request module 602 generating both the requested route/time 604A and the requested route/time 604B.

The robot modules 104 are in communication with the robot management module 108 and transmit the requested route/times 604 to the robot management module 108. The robot modules 104 (or a single robot module 104) may send the requested route/times 604 concurrently or separately. In the case of a single route request module 602 for a plurality of robots, requested route/times 604 may be batched and transmitted for receipt by the robot management module 108.

Each of the requested routes/times 604 may be received by a route management module 606 that generates an approval 608, a modified approval 610, or a disapproval 612 of the respective requested route/time 604. The approval 608 is indicative that the associated robot may travel along the requested route/time 604. The modified approval 610 is indicative that the associated robot may travel along a modification of the requested route/time 604 (e.g., a different path and/or a different time). The disapproval 612 is indicative that the associated robot may not travel along the requested route/time 604.

To determine whether to issue the approval 608, the modified approval 610, or the disapproval 612, the route management module 606 may first determine, at decision 614, whether the associated robot is registered. The route management module 606 may compare the identifier of the associated robot (e.g., received as part of the requested route/time 604) to a plurality of registered robots 616. If the associated robot is not one of the registered robots 616 (e.g., a "no" out of decision 614), the route management module 606 may issue the disapproval 612.

If the associated robot is one of the registered robots 616 (e.g., a "yes" out of decision 614), the route management module 606 may determine, at decision 618, whether the requested route/time 604 are ok. If the requested route/time 604 is ok (e.g., a "yes" out of decision 618), the route management module 606 may issue the approval 608.

If the requested route/time 604 are not ok (e.g., a "no" out of decision 620), the route management module 606 may determine, at decision 620, whether a modification of the requested route/time 604 are ok. If a modification of the requested route/time 604 is ok (e.g., a "yes" out of decision 620), the route management module 606 may issue the modified approval 610 (e.g., with a modified path and/or time). If a modification of the requested route/time 604 cannot be determined within certain parameters such as a time frame or distance variance (e.g., a "no" out of decision 620), the route management module 606 may issue the disapproval 612. Attributes of the environment surrounding the requested route/time 604 are used to make the decision 618 and the decision 620, as discussed further below.

The approval 608, the modified approval 610, or the disapproval 612 is then transmitted back to the associated route request module 602 (e.g., via a transmission of an approval message, a modified approval message, or a disapproval message, respectively). In the case of the approval 608 and the modified approval 610, the associated robot may then progress along the corresponding path and at the corresponding time (e.g., along the approved route).

The robot module 104 may be configured to transmit periodic messages/updates as the robot 102 travels along the approved route. For example, the robot module 104 may transit messages when a route is started, at certain intervals or segments along the route, and when the route is completed. The robot module 104 may also transmit messages about locations or other information about the robot 102 when the robot 102 is idle.

In some implementations, the decision 620 may not occur. For example, if the route management module 606 is not configured to determine alternatives or modifications to the requested route/time 604, then a "no" out of decision 618 may result in the disapproval 612. In such cases (similar to receiving the disapproval 612 resulting from the "no" out of decision 620), the route request module 602 of the robot module 104 may transmit another requested route/time 604. In some implementations, reasons why the requested route/time 604 was disapproved may be given (e.g., too many robots, too much pedestrian traffic, construction zone, another area is less crowded) such that the route request module 602 may better determine the other requested route/time 604. Also, in some implementations, decision 614 may not occur (e.g., it may be omitted such that the first, and possibly, the only, decision is decision 618).

In order to make the decision 618 and the decision 620 (if used), the route management module 606 may utilize a dynamic map 622. The dynamic map 622 is indicative of any map or database that contains dynamic information about the urban environment that the robots travel within. For example, the dynamic map 622 may contain information about pedestrian densities, traffic densities, construction areas, blockages, weather, events, accidents, emergency vehicles or emergency situations, other robots, "no-go" zones, or any other information that may affect how the associated robot progresses/moves along the route (e.g., they are likely to get stuck, take too long avoiding obstacles, have a run in with another robot). If there is a high density of pedestrian traffic along the requested route, for example, then the route management module 606 may issue the disapproval 612 or the modified approval 610 with a route that has less pedestrian traffic. The information may be real-time or based on historical data. Furthermore, certain aspects may have associated times, e.g., an event is happening on a certain day at a certain time in a certain area.

In some implementations, certain operators may be allowed more robots in an area than others. Similar to how the Federal Communications Commission distributes spectrum for cellular communications to various providers, the robot management module 108 may license certain densities of robots to respective operators. The allowed densities may then be used to determine whether requested routes/times 604 are approved.

In some implementations, the size, shape, weight, or other aspects of the robot may be used to determine whether the approval 608, the modified approval 610, or the disapproval 612 are issued. For example, the route management module 606 may determine whether the robot 102 is too big for the requested route/time 604 (e.g., it will overflow into a traffic lane or take up too much of a sidewalk).

Other aspects such as "no-cell" zones or businesses that do not want robots 102 on or near the premises may be included in the dynamic map 622. The route management module 606 may then ensure that robots 102 avoid such "no-go" areas.

The information is compiled by a map update module 624 that is configured to maintain the dynamic map 622. As part of maintaining the dynamic map 622, approved routes 626 are added to the dynamic map 622. The approved routes 626 are indicative of requested routes/times 604 that receive the approval 608 or modifications of the routes/times 604 as part of the modified approval 610. Thus, the map update module 624 maintains the dynamic map 622 such that the robot management module 108 is aware of approved routes and approved times that the registered robots 616 are traveling.

Figure 7:
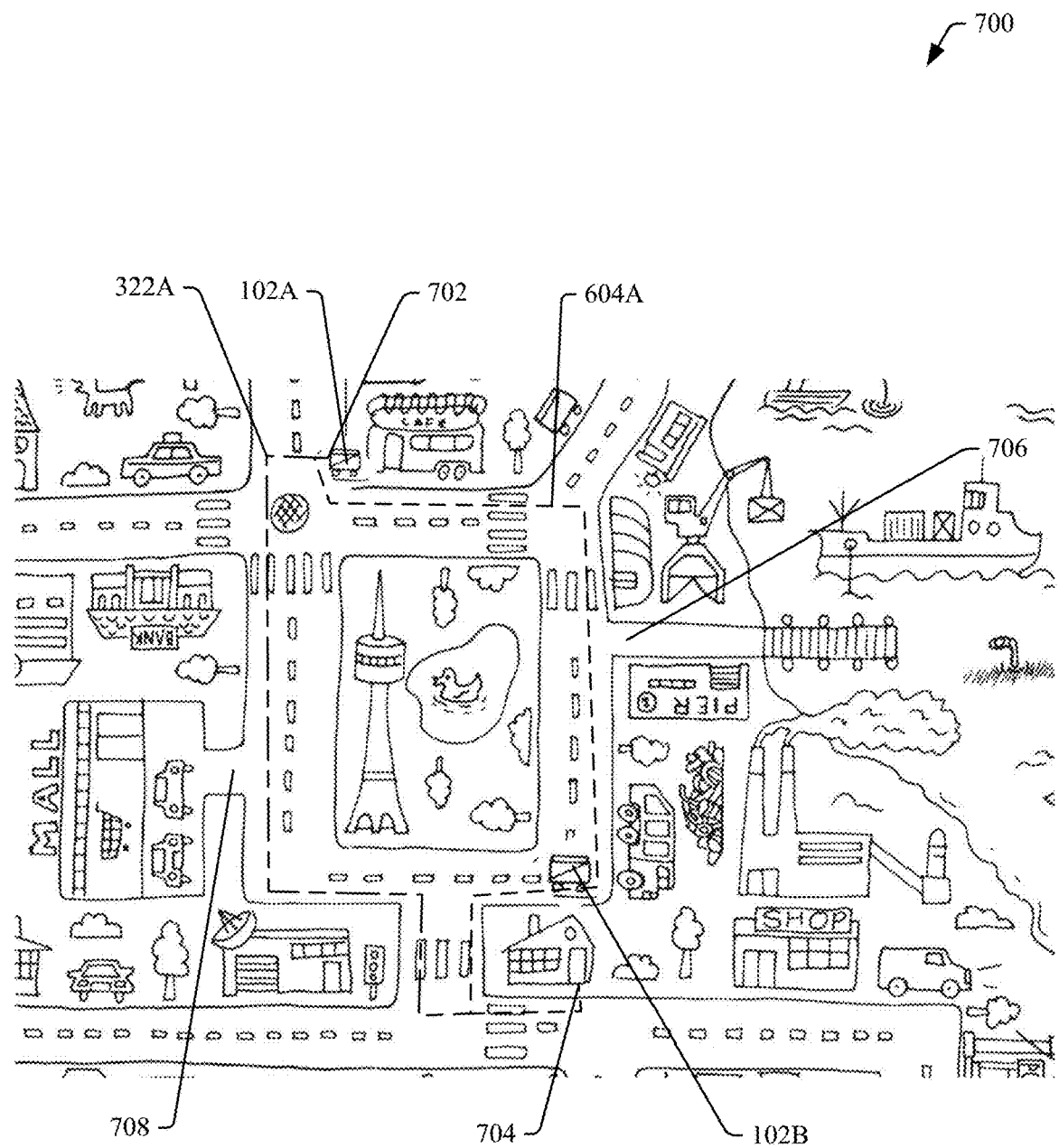
FIG. 7 illustrates, in accordance with techniques of this disclosure, an example of route modification for robot management in populated areas.

FIG. 7 illustrates, at 700, an example of route modification for robot management in populated areas. The illustrated example includes robot 102A and robot 102B. Assume that robot 102B will travel along a previously approved route (not shown) at a certain time. Now assume that robot 102A generates a requested route/time 604A from an origin 702 to a destination 704. The route management module 606 may determine, based on the dynamic map 622, that robot 102A will intersect with robot 102B along the requested route/time 604A or that there are too many approved routes 626 in an area surrounding the requested route/time 604A at the time of the requested route/time 604A (e.g., robot density will be over a certain pre-selected value).

Either way, the route management module 606 determines that the robot 102A should not be allowed along the requested route/time 604A. In one implementation, the route management module 606 may issue the disapproval 612, such that the route request module 602A can request an alternate route/time (e.g., that, if approved, becomes the approved route 322A). In another implementation, the route management module 606 may determine the alternative route/time and issue the modified approval 610 with the approved route 322A.

There may be factors other than other robots 102 or robot densities usable to manage requested routes/times 604 (e.g., those discussed above). For example, consider that there may be a large amount of pedestrian traffic coming from a pier at location 706 at a certain time but not a lot of people near a mall at location 708. Since the dynamic map 622 may contain such information, the route management module 606 (or the route request module 602A with help from the route management module 606) may determine that the approved route 322A avoids the congestion and, thus, is better.

Figure 8:
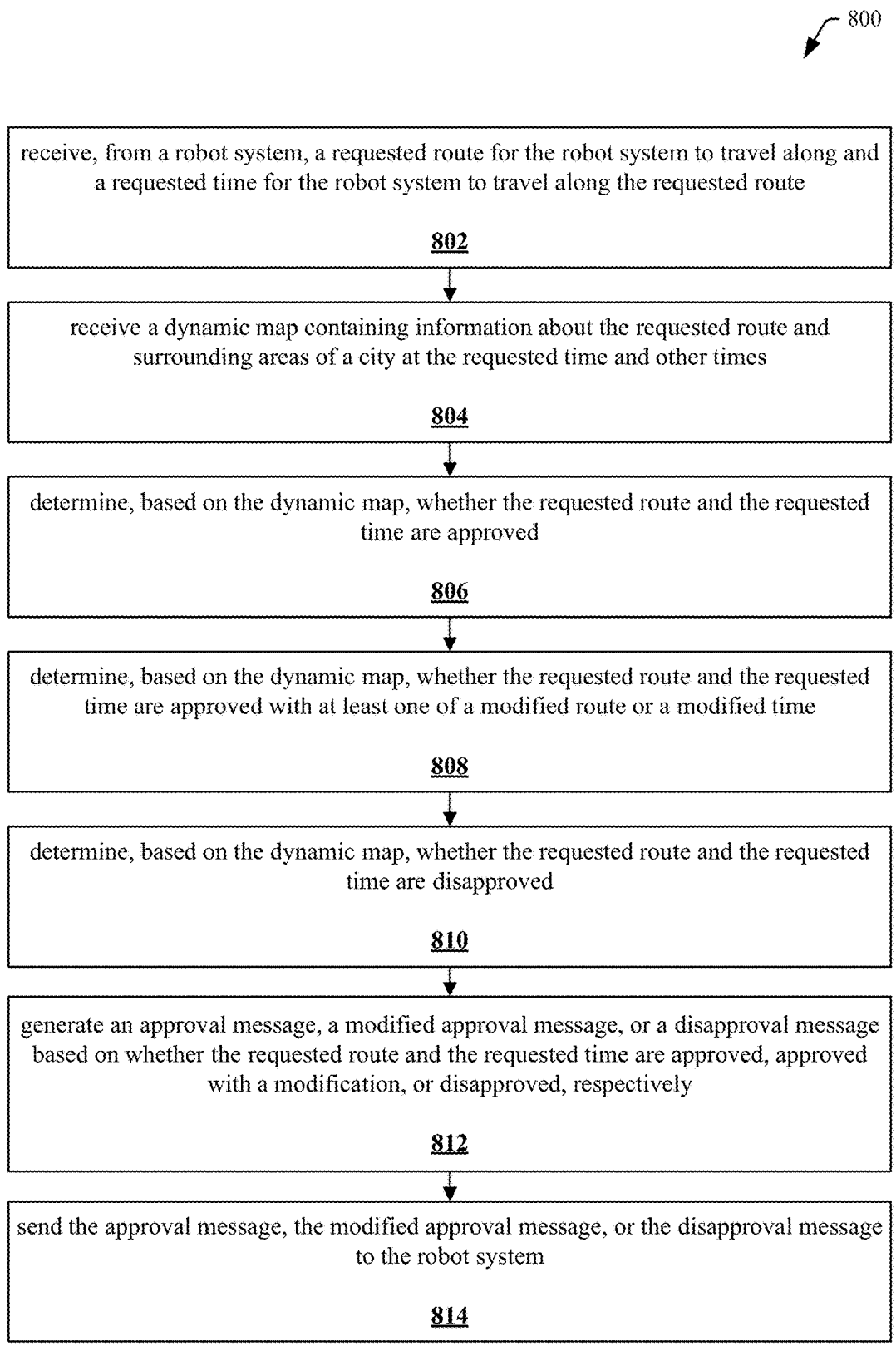
FIG. 8 illustrates, in accordance with techniques of this disclosure, an example method of route management for robot management in populated areas.

FIG. 8 illustrates an example method 800 of route management for robot management in populated areas. The example method 800 may be implemented in any of the previously described environments, by any of the previously described systems or components, and by utilizing any of the previously described flows or techniques. The example method 800 may also be implemented in other environments, by other systems or components, and utilizing other flows or techniques. Example method 800 may be implemented by one or more entities (e.g., the robot management module 108). The order in which the operations are shown and/or described is not intended to be construed as a limitation, and the order may be rearranged without departing from the scope of this disclosure. Furthermore, any number of the operations can be combined with any other number of the operations to implement the example process flow or an alternate process flow.

At step 802, a requested route for a robot system to travel along and a requested time for the robot system to travel along the requested route is received from the robot system. For example, the route management module 606 may receive a requested route/time 604 from the robot system 200 associated with a robot 102.

At step 804, a dynamic map containing information about the requested route and surrounding areas of a city at the requested time and other times is received. For example, the route management module 606 may receive the dynamic map 622. The times and other times are represented by the temporal aspects (e.g., time domain) of the dynamic map 622.

At step 806, it is determined, based on the dynamic map, whether the requested route and the requested time are approved. For example, the route management module 606 may determine an outcome to decision 618.

At step 808, it is determined, based on the dynamic map, whether the requested route and the requested time are approved with at least one of a modified route or a modified time. For example, the route management module 606 may determine an outcome to decision 620.

At step 810, it is determined, based on the dynamic map, whether the requested route and the requested time are disapproved. For example, the route management module 606 may determine an outcome to decision 614 and/or decision 620.

At step 812, an approval message, a modified approval message, or a disapproval message is generated based on whether the requested route and the requested time are approved, approved with a modification, or disapproved, respectively. For example, the route management module 606 may determine whether to issue the approval 608 based on decision 618, whether to issue the modified approval 610 based on decision 620, and whether to issue the disapproval 612 based on decision 614 and/or decision 620.

At step 814, the approval message, the modified approval message, or the disapproval message is sent to the robot system. For example, the route management module 606 may send the approval 608, the modified approval 610, or the disapproval 612 to the robot system 200 associated with the robot 102.

Although described in relation to an outside environment, the techniques and systems described above may be easily adapted for internal environments. For example, the route management module 606 may determine that certain hallways or areas of an interior of a building are occupied (e.g., based on the dynamic map 622 having information about the interior of the building) and reroute robots 102 to avoid the congestion.

EXAMPLE MAP UPDATES

Figure 9:
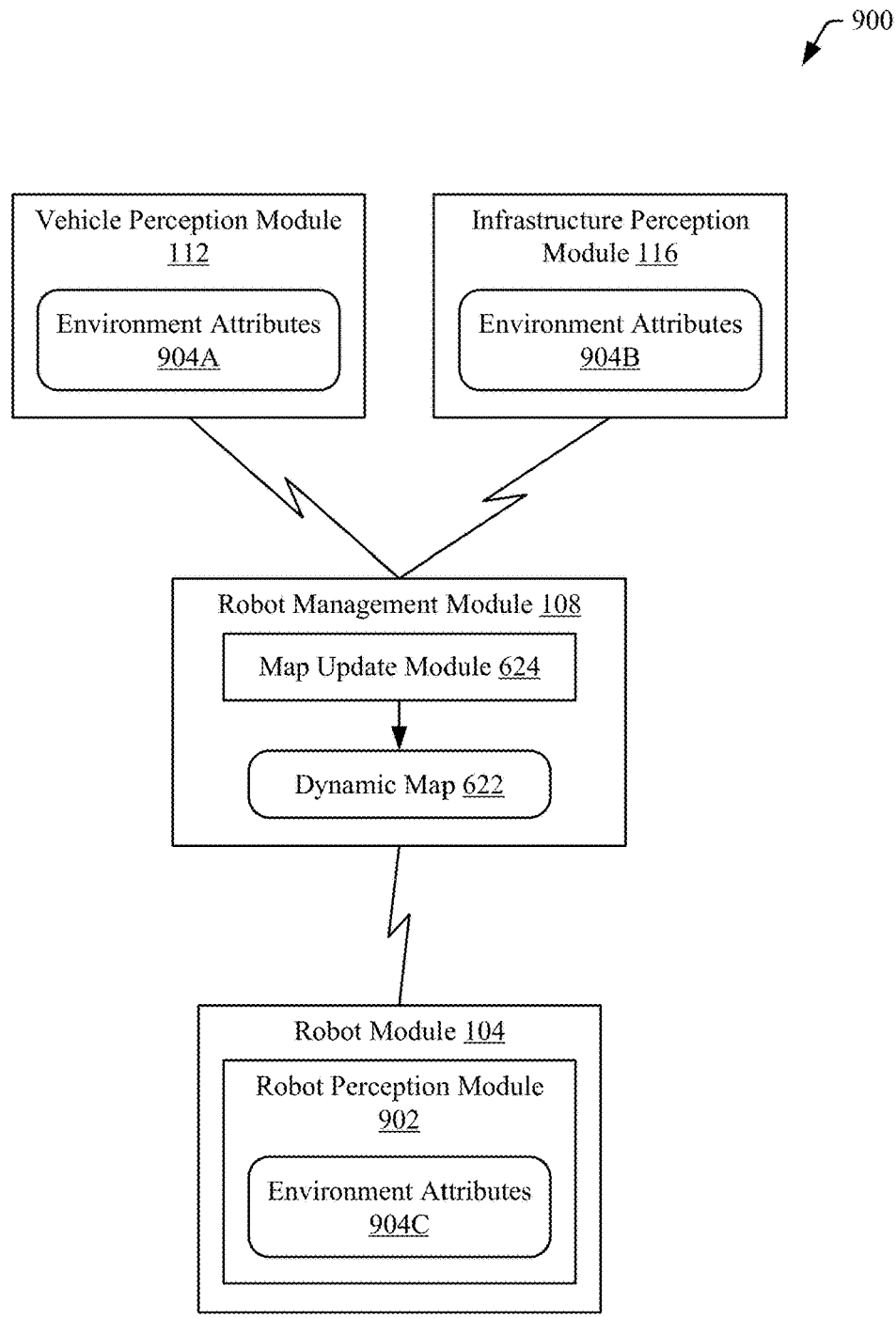
FIG. 9 illustrates, in accordance with techniques of this disclosure, an example flow of updating a dynamic map for robot management in populated areas.

FIG. 9 illustrates, at 900, an example flow of updating a dynamic map for robot management in populated areas. As discussed above, the map update module 624 may update the dynamic map 622 to have information about the approved routes 626. In order to get information about other attributes of the urban environment (e.g., traffic, densities, weather, accidents, blockages), the map update module 624 may pool information from any number of remote sources.

Along with traditional databases (e.g., GIS data, police data, internet data), the map update module 624 may obtain information from the vehicle perception module 112, the infrastructure perception module 116, and/or a robot perception module 902 of the robot module 104 (collectively referred to as perception modules). The perception modules may be able to determine respective environment attributes 904 and communicate them with the map update module 624.

The perception modules may use data from any number of sensors to determine any number of attributes about environments surrounding the vehicle 110, the infrastructure 114, and/or the robot 102, respectively. The attributes may comprise aspects such as vehicle density, pedestrian density, street widths, sidewalk widths, bike lane widths, crosswalk availabilities, road closures, construction work, broken down vehicles, accidents, emergency vehicles, weather, road/sidewalk conditions, objects (lights, signs, etc.), events, and so on. For example, the perception modules may use radar, lidar, and/or camera data (or a combination thereof) to determine densities of vehicles and pedestrians proximate their locations.

The perception modules may form the environment attributes 904 based on the attributes they determine from the sensor data and communicate the environment attributes 904 to the map update module 624 via their respective communication systems (e.g., via environment messages). In this way, the dynamic map 622 contains temporal information (e.g., real-time and/or predictive based on data analytics) about aspects usable by the route management module 606 to determine whether to approve requested routes or not, as discussed above.

EXAMPLE ROUTE VERIFICATION

Figure 10:
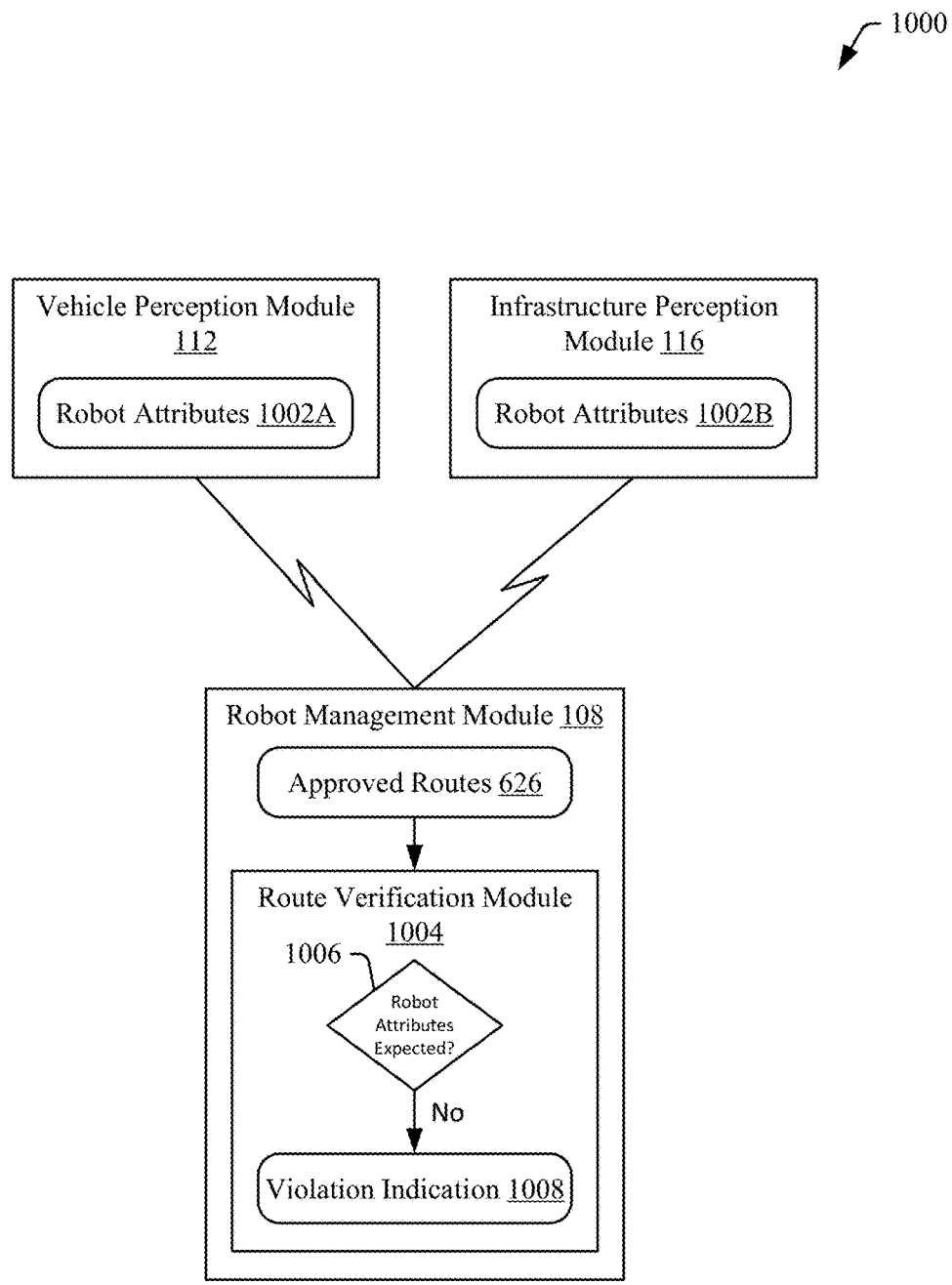
FIG. 10 illustrates, in accordance with techniques of this disclosure, an example flow of route verification for robot management in populated areas.

FIG. 10 illustrates, at 1000, an example flow of route verification for robot management in populated areas. If robots 102 are only operating under the techniques discussed above (e.g., traveling along approved routes), there may not be any problems with their use. There is, however, a possibility that robots 102 may travel along unapproved routes, spoof their locations, and/or travel unregistered. To mitigate such situations, the robot management module 108 may leverage one or more of the perception modules to monitor their activity.

The perception modules may determine, based on sensor data, that a robot 102 is within a vicinity and determine robot attributes 1002 of the robot 102. The robot attributes 1002 may comprise a registration or serial number, an operator or company, a location, a heading, a speed, an acceleration, a size, or a shape of the associated robot 102.

For example, the vehicle perception module 112 may use the sensor data 410 to determine that a robot 102 is crossing in front of the vehicle 110. Various techniques may be used to identify the robot 102 from other objects. The vehicle perception module 112 may then determine a serial number of the robot (e.g., based on optical or other sensor data or a message received from the robot 102). The vehicle perception module 112 may then estimate a location of the robot 102 and send the location along with the serial number (or other identifying information if a serial number is not determined) to a route verification module 1004 of the robot management module 108.

The route verification module 1004 may receive the robot attributes 1002 and compare them to the approved routes 626, at decision 1006, to determine if the robot attributes 1002 are expected (e.g., a registered robot on an approved route 626). If the robot attributes 1002 are not expected (e.g., a "no" out of decision 1006), the route verification module 1004 may issue a violation indication 1008.

The violation indication 1008 may be used to fine the operator of the robot 102. Also, the violation indication 1008 may be sent to local law enforcement for other disciplinary actions (e.g., robot confiscation). By using these techniques, the robot management module 108 may better ensure that robots 102 only travel along approved routes 626 (or within some proximity of them).

Figure 11:
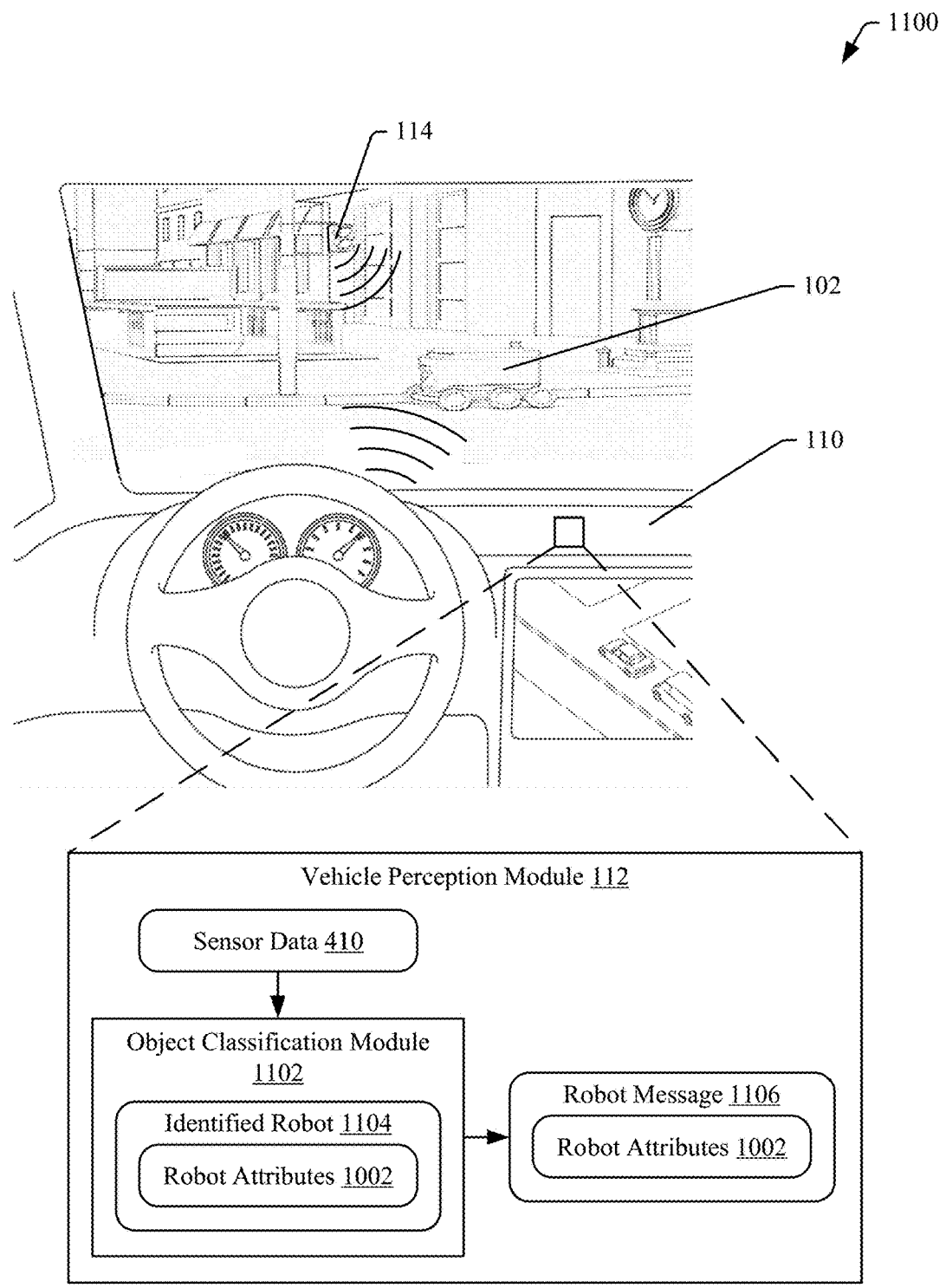
FIG. 11 illustrates, in accordance with techniques of this disclosure, an example of determining robot attributes for robot management in populated areas.

FIG. 11 illustrates, at 1100, an example of generating robot attributes 1002 for use in route verification. In the illustrated example, a robot 102 is within a sensor range of the vehicle 110. The vehicle perception module 112 uses the sensor data 410 (e.g., radar, lidar, cameras, some combination thereof) to detect the robot 102 and determine the robot attributes 1002 of the robot 102.

To do so, an object classification module 1102 may receive the sensor data 410 and identify the robot 102 from the sensor data 410 (e.g., identified robot 1104). The object classification module (or another module) may determine the robot attributes 1002 of the identified robot 1104 from the sensor data 410. For example, the object classification module 1102 may determine a location, heading, and/or speed of the identified robot 1104 relative to a vehicle coordinate system and, from that, determine an approximate global location, heading, and speed of the identified robot 1104. Furthermore, the object classification module 1102 may determine a serial number, barcode, symbol, identity, and/or operator of the identified robot 1104 from the sensor data. To do so, the object classification module 1102 may determine alphanumeric characters or a barcode on the identified robot 1104.

The vehicle perception module 112 may then generate a robot message 1106 that contains the robot attributes 1002 (including an identifier of the identified robot 1104). The robot message 1106 may be configured for transmission according to various protocols (e.g., X2X, V2X, DSRC, HTTP, internet-of-things (IoT), cellular). Furthermore, the vehicle perception module 112 may package the robot attributes within the robot message 1106 such that route verification module 1004 can determine if the identified robot 1104 is on an approved route 626 and/or operating as expected. For example, various fields may exist for various attributes. The vehicle perception module 112 may then send the robot message 1106 to the robot management module 108 for processing by the route verification module 1004.

The illustrated example also depicts the infrastructure 114 (e.g., a streetlight). The infrastructure perception module 116 (not shown) may act similarly to the vehicle perception module 112 in determining robot attributes 1002 and sending a robot message 1106 to the robot management module 108.

By using these techniques, the vehicle perception module 112 may contribute to robot management. Specifically, by using the robot messages 1106 from the vehicle, 110, other vehicles, and the infrastructure 114, the vehicle perception module 112 may leverage vast amounts of sensors in an environment to monitor robot activity. Doing so may ensure that robots are operating as directed/managed and following certain rules.

Figure 12:
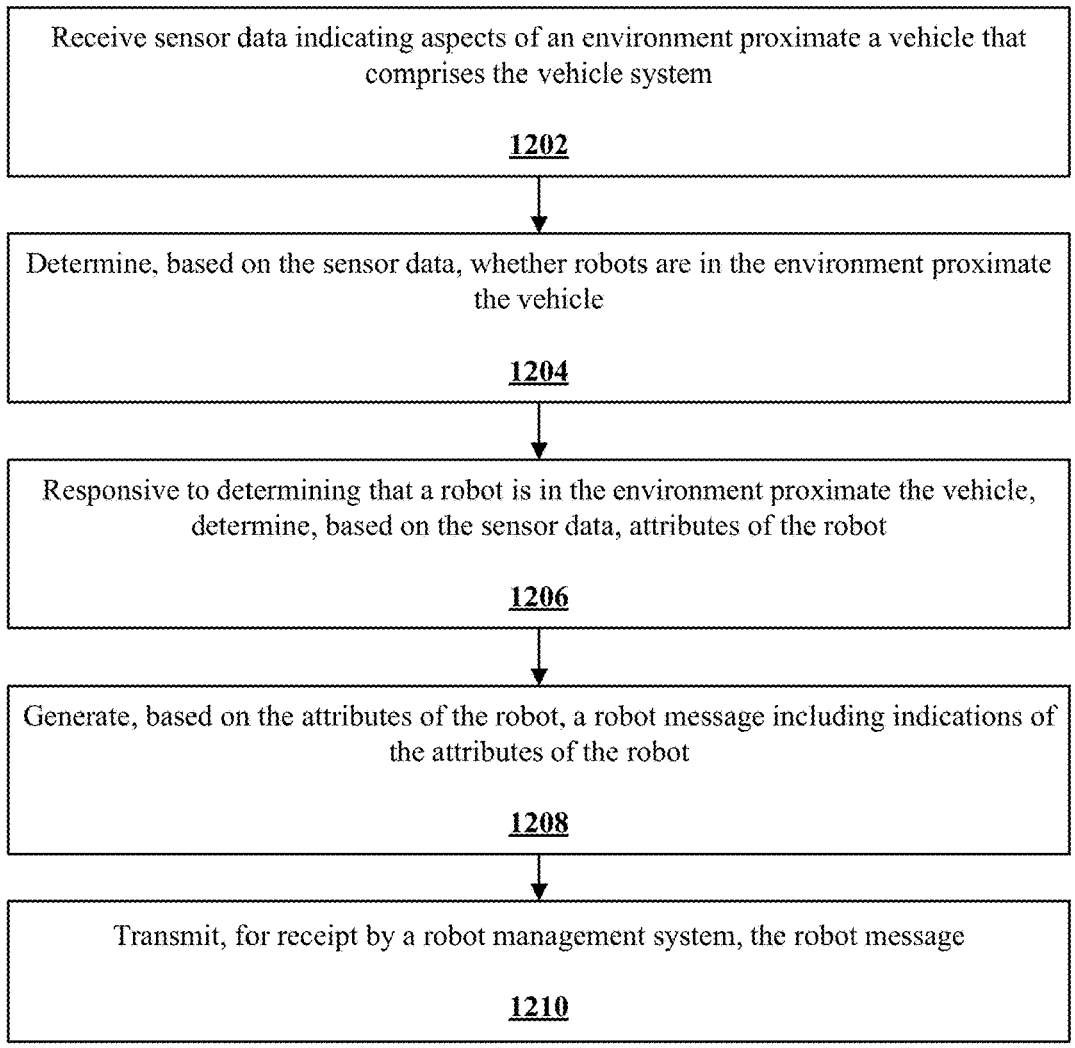
FIG. 12 illustrates, in accordance with techniques of this disclosure, an example method of route verification for robot management in populated areas.

FIG. 12 illustrates an example method 1200 of generating robot attributes 1002. The example method 1200 may be implemented in any of the previously described environments, by any of the previously described systems or components, and by utilizing any of the previously described flows or techniques. The example method 1200 may also be implemented in other environments, by other systems or components, and utilizing other flows or techniques. Example method 1200 may be implemented by one or more entities (e.g., the vehicle perception module 112). The order in which the operations are shown and/or described is not intended to be construed as a limitation, and the order may be rearranged without departing from the scope of this disclosure. Furthermore, any number of the operations can be combined with any other number of the operations to implement the example process flow or an alternate process flow.

At step 1202, sensor data is received indicating aspects of an environment proximate a vehicle that comprises the vehicle system. For example, the object classification module 1102 of the vehicle system 400 may receive the sensor data 410 about the environment proximate the vehicle 110.

At step 1204, it is determined whether robots are in the environment proximate the vehicle based on the sensor data. For example, the object classification module 1102 may use any known technique to ascertain that the identified robot 1104 (corresponding to robot 102) is proximate the vehicle 110.

At step 1206, responsive to determining that a robot is in the environment proximate the vehicle, attributes of the robot are determined based on the sensor data. For example, the object classification module 1102 may determine the robot attributes 1002, including an identifier of the robot 102.

At step 1208, a robot message including indications of the attributes of the robot is generated based on the attributes of the robot. For example, the vehicle perception module 112 may generate the robot message 1106 with indications of the robot attributes 1002.

At step 1210, the robot message is transmitted for receipt by a robot management system. For example, the robot message 1106 may be transmitted to the robot management module 108 of the robot management system 300 via the communication system 406 (X2X, cellular, DSRC, V2X, etc.).

EXAMPLES

Example 1a: A method performed by a robot management system, the method comprising: receiving, from a robot system corresponding to a robot, a requested route for the robot to travel along and a requested time for the robot to travel along the requested route; receiving a dynamic map containing information about the requested route and surrounding areas of a city at the requested time and other times; determining, based on the dynamic map, whether the requested route and the requested time are approved; determining, based on the dynamic map, whether the requested route and the requested time are approved with at least one of a modified route or a modified time; determining, based on the dynamic map, whether the requested route and the requested time are disapproved; generating an approval message, a modified approval message, or a disapproval message based on whether the requested route and the requested time are approved, approved with a modification, or disapproved, respectively; and sending the approval message, the modified approval message, or the disapproval message to the robot system.

Example 2a: The method of example 1a, further comprising determining whether the robot is one of a plurality of registered robots, wherein generating the approval message, the modified approval message, or the disapproval message is based further on whether the robot is one of the registered robots.

Example 3a: The method of any preceding example, further comprising, responsive to sending the approval message or the modified approval message, updating the dynamic map with the requested route and the requested time, the modified route and the requested time, the requested route and the modified time, or the modified route and the modified time.

Example 4a: The method of any preceding example, wherein the dynamic map comprises information about approved routes and approved times of other robots.

Example 5a: The method of example 4a, wherein the dynamic map further comprises information about at least one of: vehicle traffic, pedestrian traffic, events, closures, emergency situations, emergency vehicles, sidewalk widths, bike lane widths, streets, or street widths.

Example 6a: The method of any preceding example, wherein receiving the requested route and the requested time and sending the approval message, the modified approval message, or the disapproval message to the robot system are performed via a wireless connection between the robot system and the robot management system.

Example 7a: The method of example 6a, wherein the wireless connection comprises a vehicle-to-everything (V2X) connection, an everything-to-everything (X2X) connection, an internet-of-things (IoT) connection, a dedicated short-range communications (DSRC) connection, a Wi-Fi connection, or a cellular connection.

Example 8a: The method of any preceding example, wherein determining whether the requested route and the requested time are approved, approved with a modification, or disapproved is based further on minimizing a density of robots along the requested route and at the requested time.

Example 9a: The method of any preceding example, further comprising receiving periodic messages from the robot system as the robot progresses along the approved route or the modified route.

Example 10a: The method of any preceding example, further comprising receiving a robot message from a vehicle system or an infrastructure system, the robot message describing attributes of the robot as the robot moves throughout the city.

Example 11a: A robot management system comprising: at least one processor configured to: receive, from a robot system associated with a robot, a requested route for the robot to travel along and a requested time for the robot to travel along the requested route; receive a dynamic map containing information about the requested route and surrounding areas of a city at the requested time and other times; determine, based on the dynamic map, whether the requested route and the requested time are approved; determine, based on the dynamic map, whether the requested route and the requested time are approved with at least one of a modified route or a modified time; determine, based on the dynamic map, whether the requested route and the requested time are disapproved; generate an approval message, a modified approval message, or a disapproval message based on whether the requested route and the requested time are approved, approved with a modification, or disapproved, respectively; and send the approval message, the modified approval message, or the disapproval message to the robot system.

Example 12a: The system of example 11a, wherein: the processor is further configured to determine whether the robot is one of a plurality of registered robots; and the generation of the approval message, the modified approval message, or the disapproval message is based further on whether the robot is one of the registered robots.

Example 13a: The system of example 11a or 12a, wherein the processor is further configured to, responsive to sending the approval message or the modified approval message, update the dynamic map with the requested route and the requested time, the modified route and the requested time, the requested route and the modified time, or the modified route and the modified time.

Example 14a: The system of any of examples 11a-13a, wherein the dynamic map comprises information about approved routes and approved times of other robots and at least one of: vehicle traffic, pedestrian traffic, events, closures, emergency situations, emergency vehicles, sidewalk widths, bike lane widths, streets, or street widths.

Example 15a: The system of any of examples 11a-14a, wherein the receipt of the requested route and the requested time and the transmission of the approval message, the modified approval message, or the disapproval message to the robot system are performed via a wireless connection between the robot system and the robot management system.

Example 16a: The system of example 15a, wherein the wireless connection comprises a vehicle-to-everything (V2X) connection, an everything-to-everything (X2X) connection, an internet-of-things (IoT) connection, a dedicated short-range communications (DSRC) connection, a Wi-Fi connection, or a cellular connection.

Example 17a: The system of any of examples 11a-16a, wherein the determination of whether the requested route and the requested time are approved, approved with a modification, or disapproved is based further on minimizing a density of robots along the requested route and at the requested time.

Example 18a: The system of any of examples 11a-17a, wherein the processor is further configured to receive periodic messages from the robot system as the robot progresses along the approved route or the modified route.

Example 19a: The system of any of examples 11a-18a, wherein the processor is further configured to receive a robot message from a vehicle system or an infrastructure system describing attributes of the robot as the robot moves throughout the city.

Example 20a: Computer-readable storage media comprising instructions that, when executed, cause at least one processor to: receive, from a robot system associated with a robot, a requested route for the robot to travel along and a requested time for the robot to travel along the requested route; receive a dynamic map containing information about the requested route and surrounding areas of a city at the requested time and other times; determine, based on the dynamic map, whether the requested route and the requested time are approved; determine, based on the dynamic map, whether the requested route and the requested time are approved with at least one of a modified route or a modified time; determine, based on the dynamic map, whether the requested route and the requested time are disapproved; generate an approval message, a modified approval message, or a disapproval message based on whether the requested route and the requested time are approved, approved with a modification, or disapproved, respectively; and send the approval message, the modified approval message, or the disapproval message to the robot system.

Example 1b: A method performed by a vehicle system, the method comprising:

receiving sensor data indicating aspects of an environment proximate a vehicle that comprises the vehicle system; determining, based on the sensor data, whether robots are in the environment proximate the vehicle; responsive to determining that a robot is in the environment proximate the vehicle, determining, based on the sensor data, attributes of the robot; generating, based on the attributes of the robot, a robot message including indications of the attributes of the robot; transmitting, for receipt by a robot management system, the robot message.

Example 2b: The method of example 1b, wherein transmitting the robot message comprises transmitting the robot message via a vehicle to everything (V2X) or dedicated short range communications (DSRC) protocol.

Example 3b: The method of example 1b or 2b, wherein: the attributes of the robot comprise an identity of the robot that is specific to the robot and usable to differentiate the robot from other robots; and the robot message includes a field indicating the identity of the robot.

Example 4b: The method of example 3b, wherein determining the attributes of the robot comprises determining the identity of the robot based on optical sensor data.

Example 5b: The method of example 3b or 4b, wherein determining the identity comprises determining a serial number of the robot from detected alphanumeric characters or a barcode that is disposed on the robot.

Example 6b: The method of example 3b, wherein determining the identity comprises receiving a serial number of the robot from the robot.

Example 7b: The method of example 6b, wherein receiving the serial number of the robot comprises receiving the serial number via a vehicle to everything (V2X) or dedicated short range communications (DSRC) protocol.

Example 8b: The method of any of examples 1b-7b, wherein: the attributes of the robot comprise at least one of: a location of the robot, a heading of the robot, a speed of the robot, an acceleration of the robot, or a size of the robot; and the robot message includes respective fields that indicate the attributes of the robot.

Example 9b: The method of examples 1b-8b, further comprising: determining, based on the sensor data, attributes of the environment proximate the vehicle; generating, based on the attributes of the environment proximate the vehicle, an environment message including indications of the attributes of the environment proximate the vehicle; and transmitting, for receipt by the robot management system, the environment message.

Example 10b: The method of example 9b, wherein: the attributes of the environment comprise at least one of: an amount of traffic proximate the vehicle, an amount of pedestrians proximate the vehicle, weather proximate the vehicle, an event proximate the vehicle, a closure proximate the vehicle, or an emergency vehicle proximate the vehicle; and the environment message includes respective fields that indicate the attributes of the environment.

Example 11b: A vehicle system configured to be disposed in a vehicle, the vehicle system comprising: at least one processor configured to: receive sensor data from one or more sensors indicating an environment proximate the vehicle; determine, based on the sensor data, whether robots are in the environment proximate the vehicle; responsive to determining that a robot is in the environment proximate the vehicle, determining, based on the sensor data, attributes of the robot; generate, based on the attributes of the robot, a robot message indicating the attributes of the robot; and transmit, for receipt by a robot management system, the robot message.

Example 12b: The vehicle system of example 11b, wherein the processor is further configured to transmit the robot message via a vehicle to everything (V2X) or dedicated short range communications (DSRC) protocol.

Example 13b: The vehicle system of example 11b or 12b, wherein: the attributes of the robot comprise an identity of the robot that is specific to the robot and usable to differentiate the robot from other robots; and the robot message includes a field indicating the identity of the robot.

Example 14b: The vehicle system of example 13b, wherein the processor is further configured to determine the identity of the robot based on optical sensor data.

Example 15b: The vehicle system of example 13b or 14b, wherein the processor is further configured to determine a serial number of the robot from detected alphanumeric characters or a barcode that is disposed on the robot.

Example 16b: The vehicle system of examples 11b-15b, wherein the processor is further configured to receive a serial number of the robot from the robot.

Example 17b: The vehicle system of example 16b, wherein the processor is further configured to receive the serial number via a vehicle to everything (V2X) or dedicated short range communications (DSRC) protocol.

Example 18b: The vehicle system of examples 11b-17b, wherein: the attributes of the robot comprise at least one of: a location of the robot, a heading of the robot, a speed of the robot, an acceleration of the robot, or a size of the robot; and the robot message includes respective fields that indicate the attributes of the robot.

Example 19b: The vehicle system of examples 11b-18b, wherein the processor is further configured to: determine, based on the sensor data, attributes of the environment proximate the vehicle, the attributes of the environment proximate the vehicle comprising at least one of: an amount of vehicle traffic proximate the vehicle, an amount of pedestrians proximate the vehicle, weather proximate the vehicle, an event proximate the vehicle, a closure proximate the vehicle, or an emergency vehicle proximate the vehicle; generate, based on the attributes of the environment proximate the vehicle, an environment message including indications of the attributes of the environment proximate the vehicle; and transmit, for receipt by the robot management system, the environment message.

Example 20b: Computer-readable storage media comprising instructions that, when executed, cause at least one processor to: receive sensor data from one or more sensors indicating an environment proximate the vehicle; determine, based on the sensor data, whether robots are in the environment proximate the vehicle; responsive to determining that a robot is in the environment proximate the vehicle, determining, based on the sensor data, attributes of the robot; generate, based on the attributes of the robot, a robot message indicating the attributes of the robot; and transmit, for receipt by a robot management system, the robot message.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the spirit and scope of the disclosure as defined by the following claims.

The use of "or" and grammatically related terms indicates non-exclusive alternatives without limitation unless the context clearly dictates otherwise. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

What is claimed is:

1. A method performed by a robot management system, the method comprising:
receiving, from a robot system corresponding to a robot, a requested route for the robot to travel along and a requested time for the robot to travel along the requested route;
receiving a dynamic map containing information about the requested route and surrounding areas of a city at the requested time and other times;
determining, based on the dynamic map, whether the requested route and the requested time are approved;
determining, based on the dynamic map, whether the requested route and the requested time are approved with at least one of a modified route or a modified time;
determining, based on the dynamic map, whether the requested route and the requested time are disapproved;

generating an approval message, a modified approval message, or a disapproval message based on whether the requested route and the requested time are approved, approved with a modification, or disapproved, respectively; and sending the approval message, the modified approval message, or the disapproval message to the robot system.

2. The method of claim 1, further comprising determining whether the robot is one of a plurality of registered robots, wherein generating the approval message, the modified approval message, or the disapproval message is based further on whether the robot is one of the registered robots.

3. The method of claim 1, further comprising, responsive to sending the approval message or the modified approval message, updating the dynamic map with the requested route and the requested time, the modified route and the requested time, the requested route and the modified time, or the modified route and the modified time.

4. The method of claim 1, wherein the dynamic map comprises information about approved routes and approved times of other robots.

5. The method of claim 4, wherein the dynamic map further comprises information about at least one of: vehicle traffic, pedestrian traffic, events, closures, emergency situations, emergency vehicles, sidewalk widths, bike lane widths, streets, or street widths.

6. The method of claim 1, wherein receiving the requested route and the requested time and sending the approval message, the modified approval message, or the disapproval message to the robot system are performed via a wireless connection between the robot system and the robot management system.

7. The method of claim 6, wherein the wireless connection comprises a vehicle-to-everything (V2X) connection, an everything-to-everything (X2X) connection, an internet-of-things (IoT) connection, a dedicated short-range communications (DSRC) connection, a Wi-Fi connection, or a cellular connection.

8. The method of claim 1, wherein determining whether the requested route and the requested time are approved, approved with a modification, or disapproved is based further on minimizing a density of robots along the requested route and at the requested time.

9. The method of claim 1, further comprising receiving periodic messages from the robot system as the robot progresses along the approved route or the modified route.

10. The method of claim 1, further comprising receiving a robot message from a vehicle system or an infrastructure system, the robot message describing attributes of the robot as the robot moves throughout the city.

11. A robot management system comprising:
at least one processor configured to:
receive, from a robot system associated with a robot, a requested route for the robot to travel along and a requested time for the robot to travel along the requested route;
receive a dynamic map containing information about the requested route and surrounding areas of a city at the requested time and other times;
determine, based on the dynamic map, whether the requested route and the requested time are approved;
determine, based on the dynamic map, whether the requested route and the requested time are approved with at least one of a modified route or a modified time;
determine, based on the dynamic map, whether the requested route and the requested time are disapproved;
generate an approval message, a modified approval message, or a disapproval message based on whether the requested route and the requested time are approved, approved with a modification, or disapproved, respectively; and
send the approval message, the modified approval message, or the disapproval message to the robot system.

12. The system of claim 11, wherein:
the processor is further configured to determine whether the robot is one of a plurality of registered robots; and
the generation of the approval message, the modified approval message, or the disapproval message is based further on whether the robot is one of the registered robots.

13. The system of claim 11, wherein the processor is further configured to, responsive to sending the approval message or the modified approval message, update the dynamic map with the requested route and the requested time, the modified route and the requested time, the requested route and the modified time, or the modified route and the modified time.

14. The system of claim 11, wherein the dynamic map comprises information about approved routes and approved times of other robots and at least one of: vehicle traffic, pedestrian traffic, events, closures, emergency situations, emergency vehicles, sidewalk widths, bike lane widths, streets, or street widths.

15. The system of claim 11, wherein the receipt of the requested route and the requested time and the transmission of the approval message, the modified approval message, or the disapproval message to the robot system are performed via a wireless connection between the robot system and the robot management system.

16. The system of claim 15, wherein the wireless connection comprises a vehicle-to-everything (V2X) connection, an everything-to-everything (X2X) connection, an internet-of-things (IoT) connection, a dedicated short-range communications (DSRC) connection, a Wi-Fi connection, or a cellular connection.

17. The system of claim 11, wherein the determination of whether the requested route and the requested time are approved, approved with a modification, or disapproved is based further on minimizing a density of robots along the requested route and at the requested time.

18. The system of claim 11, wherein the processor is further configured to receive periodic messages from the robot system as the robot progresses along the approved route or the modified route.

19. The system of claim 11, wherein the processor is further configured to receive a robot message from a vehicle system or an infrastructure system describing attributes of the robot as the robot moves throughout the city.

20. Computer-readable storage media comprising instructions that, when executed, cause at least one processor to:
receive, from a robot system associated with a robot, a requested route for the robot to travel along and a requested time for the robot to travel along the requested route;
receive a dynamic map containing information about the requested route and surrounding areas of a city at the requested time and other times;
determine, based on the dynamic map, whether the requested route and the requested time are approved;

determine, based on the dynamic map, whether the requested route and the requested time are approved with at least one of a modified route or a modified time;

determine, based on the dynamic map, whether the requested route and the requested time are disapproved;

generate an approval message, a modified approval message, or a disapproval message based on whether the requested route and the requested time are approved, approved with a modification, or disapproved, respectively; and send the approval message, the modified approval message, or the disapproval message to the robot system.

* * * * *